United States Patent [19]
Hirschfield et al.

[11] Patent Number: 5,787,336
[45] Date of Patent: Jul. 28, 1998

[54] SATELLITE COMMUNICATION POWER MANAGEMENT SYSTEM

[75] Inventors: Edward Hirschfield, Cupertino; Robert A. Wiedeman, Los Altos, both of Calif.; Stanley Canter, Phoenix, Ariz.

[73] Assignee: Space Systems/Loral, Inc., Palo Alto, Calif.

[21] Appl. No.: 336,387

[22] Filed: Nov. 8, 1994

[51] Int. Cl.$^6$ ............................................. H04B 7/185
[52] U.S. Cl. ........................... 455/13.4; 455/9; 455/12.1; 455/103; 455/127; 342/354; 363/15; 330/129
[58] Field of Search ........................... 455/13.4, 11.1, 455/12.1, 13.1, 15, 9, 10, 17, 103, 127, 69, 115, 232.1, 233.1, 234.1, 234.2, 235.1, 246.1, 249.1, 250.1; 342/354, 355; 363/26, 15; 330/129, 278, 279

[56] References Cited

U.S. PATENT DOCUMENTS

| Re. 32,905 | 4/1989 | Baran . | |
|---|---|---|---|
| 3,028,488 | 4/1962 | Hudspeth et al. . | |
| 3,095,538 | 6/1963 | Silberstein . | |
| 3,735,235 | 5/1973 | Hamilton et al. ................ | 363/26 |
| 3,928,804 | 12/1975 | Schmidt et al. . | |
| 4,090,199 | 5/1978 | Archer . | |
| 4,187,506 | 2/1980 | Dickinson . | |
| 4,380,089 | 4/1983 | Weir . | |
| 4,599,619 | 7/1986 | Keigler et al. . | |
| 4,612,546 | 9/1986 | Rosen . | |
| 4,630,058 | 12/1986 | Brown . | |
| 4,731,869 | 3/1988 | Farrer ................................ | 455/127 |

(List continued on next page.)

FOREIGN PATENT DOCUMENTS

| 0 257 404 A2 | 3/1988 | European Pat. Off. . |
|---|---|---|
| 0 421 698 A3 | 10/1991 | European Pat. Off. . |
| 2 515 385 | 4/1983 | France . |
| WO 90/13186 | 11/1990 | WIPO . |
| WO 91/09473 | 6/1991 | WIPO . |

OTHER PUBLICATIONS

Patent Abstracts of Japan No.: JP5114878 Transmission Power Control System for Transponders, vol. 17, No. 476, Telegr & Teleph Corp.

Petition of American Mobile Satellite Corporation Before the FCC, Washington, DC 20554, dated Jun. 3, 1991, pp. 1–15.

Application of Motorola Satellite Communications, Inc. for Iridium A Low Earth Orbit Mobile Satellite System before the FCC, Washington, D.C. Dec. 1990, pp. 49–96.

(List continued on next page.)

*Primary Examiner*—Reinhard J. Eisenzopf
*Assistant Examiner*—Doris To
*Attorney, Agent, or Firm*—Perman & Green, LLP

[57] ABSTRACT

Disclosed is a method for operating a communications signal transmitter and apparatus for carrying out the method. The method includes the steps of receiving a communications signal; sensing a signal strength of the received communications signal, the signal strength being indicative of the current user demand; adjusting an output of a power supply that supplies operating power to a communications signal transmitter amplifier in accordance with the sensed signal strength so as to increase the output of the power supply when the sensed signal strength increases and to decrease the output of the power supply when the sensed signal strength decreases; and amplifying the received communications signal with the communications signal transmitter amplifier. The step of sensing may include a step of subtracting a noise component from the received communications signal. The step of adjusting includes the steps of setting the duty cycle of a pulse width modulated signal as a function of at least the sensed signal strength; driving a switch with the pulse width modulated signal to chop a primary DC source into an AC signal; and synchronously rectifying the AC signal with an inverse of the pulse width modulated signal to provide a DC output from the power supply for supplying the operating power to the communications signal transmitter amplifier.

14 Claims, 4 Drawing Sheets

U.S. PATENT DOCUMENTS

| | | | |
|---|---|---|---|
| 4,870,698 | 9/1989 | Katsuyama et al. . | |
| 4,901,307 | 2/1990 | Gilhousen et al. . | |
| 4,931,802 | 6/1990 | Assal et al. . | |
| 5,010,317 | 4/1991 | Schwendeman et al. . | |
| 5,025,485 | 6/1991 | Csongor et al. . | |
| 5,073,900 | 12/1991 | Mallinckrodt . | |
| 5,081,703 | 1/1992 | Lee . | |
| 5,109,390 | 4/1992 | Gilhousen et al. . | |
| 5,119,042 | 6/1992 | Crampton et al. | 455/127 |
| 5,119,225 | 6/1992 | Grant et al. . | |
| 5,216,427 | 6/1993 | Yan et al. . | |
| 5,233,626 | 8/1993 | Ames . | |
| 5,239,671 | 8/1993 | Linquist et al. . | |
| 5,283,587 | 2/1994 | Hirshfield et al. . | |
| 5,285,208 | 2/1994 | Bertiger et al. . | |
| 5,303,286 | 4/1994 | Wiedeman . | |
| 5,339,330 | 8/1994 | Mallinckrodt . | |
| 5,345,598 | 9/1994 | Dent | 455/127 |
| 5,359,280 | 10/1994 | Canter et al. | 323/282 |
| 5,410,728 | 4/1995 | Bertiger et al. . | |
| 5,415,368 | 5/1995 | Horstein et al. . | |
| 5,422,647 | 6/1995 | Hirshfield et al. . | |
| 5,433,726 | 7/1995 | Horstein et al. . | |
| 5,439,190 | 8/1995 | Horstein et al. . | |
| 5,446,756 | 8/1995 | Mallinckrodt . | |
| 5,448,623 | 9/1995 | Wiedeman et al. . | |
| 5,504,493 | 4/1996 | Hirschfield | 342/372 |

OTHER PUBLICATIONS

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey before the FCC, Washington, D.C. 20554, May 31, 1991 pp. 33–51.

pp. 1–187 of an Application of Loral Cellular Systems, Corp. to the FCC (Jun. 3, 1991).

pp. 1–17 of an Application of Ellipsat Corporation to the FCC (Nov. 2, 1990).

SATELLITE COMMUNICATION POWER MANAGEMENT SYSTEM

FIELD OF THE INVENTION

This invention relates generally to earth satellites and, in particular, to methods and apparatus for controlling transmitter power for a communications payload of an earth satellite.

BACKGROUND OF THE INVENTION

As a constellation of communications satellites moves around the earth, individual satellites pass over regions where the population of communications users may be high, such as urban centers, and also over other regions, such as oceans, deserts and mountainous areas, where the population of users is significantly lower. A communication satellite optimized for this type of operation would require a high peak load to average load communication capacity, with long orbital periods at low power consumption. In addition, the orbits of Low Earth Orbit (LEO) satellites move with respect to the land masses, which tends to dramatically vary the number of power peaks during a repeat cycle of up to several days or more.

A problem is thus created, the problem relating to efficiently providing the high peak load to average load communication capacity.

A desirable payload for such a communications satellite includes a transponder configured for full duplex communication. The communications payload includes one or more such transponders having at least one antenna to receive signals from the earth's surface, low noise amplifier(s), frequency converter(s), amplifiers, high power amplifier(s) and at least one transmitting antenna.

If high communication capacity were to be supplied at all times, then the electrical power to support the capacity would also be required at all times. In order to supply electrical power on-board such a satellite either a fuel-based generator, such as a nuclear reactor or a radiation heated thermopile, can be used to generate a relatively constant supply of electrical current that is used by the communications payload. Excess power is typically stored in batteries for eclipse usage. Alternatively, a solar array and battery system may be used.

For the solar array case power generation is disrupted periodically when the sun is eclipsed, during which time the batteries are partially discharged. In most cases the batteries supply power to dc-to-dc converters that, in turn, supply the required voltage and required current to the amplifiers and other active devices of the transponder(s).

A typical synchronous orbit satellite design contemplates power system designs which are sized for the maximum peak power output in both sunlit and eclipse operation. However, by using this approach the unused power capability is wasted during periods of low power consumption. Furthermore, providing a capability to provide the maximum power capacity at all times adds to the mass, cost, and complexity of the satellite and, thus, increases the cost of the overall communications system, including the launch vehicles.

SUMMARY OF THE INVENTION

The foregoing and other problems are overcome and the following objects of the invention are realized by a satellite power management system that provides efficient delivery of communications power for variable load telecommunications traffic with non-geostationary earth orbiting satellites.

The teaching of this invention enables the use of a lower powered satellite than would be required if a power capability for high communication capacity operation were supplied at all times. This enables a reduction in satellite size and mass, and a consequent reduction in satellite and launch vehicle cost. This invention further provides a mechanism for detecting the communications demand in real-time and a controller that uses this information to vary the communication capacity and the power drawn from the satellite batteries.

An object of this invention is thus to provide a satellite power management system that provides high power for communications during a time that a satellite passes over a large population of users, and substantially less power when less power is required due to low or no user demand.

A further object of this invention is to provide a satellite communications payload having an efficient peak to average power consumption ratio to minimize the cost of the overall satellite communications system.

Another object of this invention is to provide, in combination, an active transmit phased array with efficient variable power amplifiers, efficient variable dc-to-dc converters, and a controller for detecting and controlling the dc-to-dc converters to provide a satellite payload with a high peak to average power consumption ratio.

A still further object of this invention is to provide a technique for producing linear amplification across a wide dynamic range that results in proportionate power consumption.

This invention teaches a method for operating a communications signal transmitter and apparatus for carrying out the method. The method includes the steps of receiving a communications signal; sensing a signal strength of the received communications signal, the signal strength being indicative of the received power and the current user demand; adjusting an output of a power supply that supplies operating power to a communications signal transmitter amplifier in accordance with the sensed signal strength so as to increase the output of the power supply when the sensed signal strength increases and to decrease the output of the power supply when the sensed signal strength decreases; and amplifying the received communications signal with the communications signal transmitter amplifier. The step of sensing may include a step of subtracting a noise component from the received communications signal.

The step of adjusting includes the steps of setting the duty cycle of a pulse width modulated signal as a function of at least the sensed signal strength; driving a switch with the pulse width modulated signal to chop a primary DC source into an AC signal; and synchronously rectifying the AC signal with an inverse of the pulse width modulated signal to provide a DC output from the power supply for supplying the operating power to the communications signal transmitter amplifier.

In a presently preferred embodiment of this invention the switch is comprised of a field effect transistor (FET) that is coupled between the primary DC power source and a synchronous rectifier. In this embodiment the step of driving includes a step of employing a boot strap capacitor that is coupled between the synchronously rectified AC signal and a predetermined bias potential to enhance the pulse width modulated signal that is applied to a gate of the FET.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
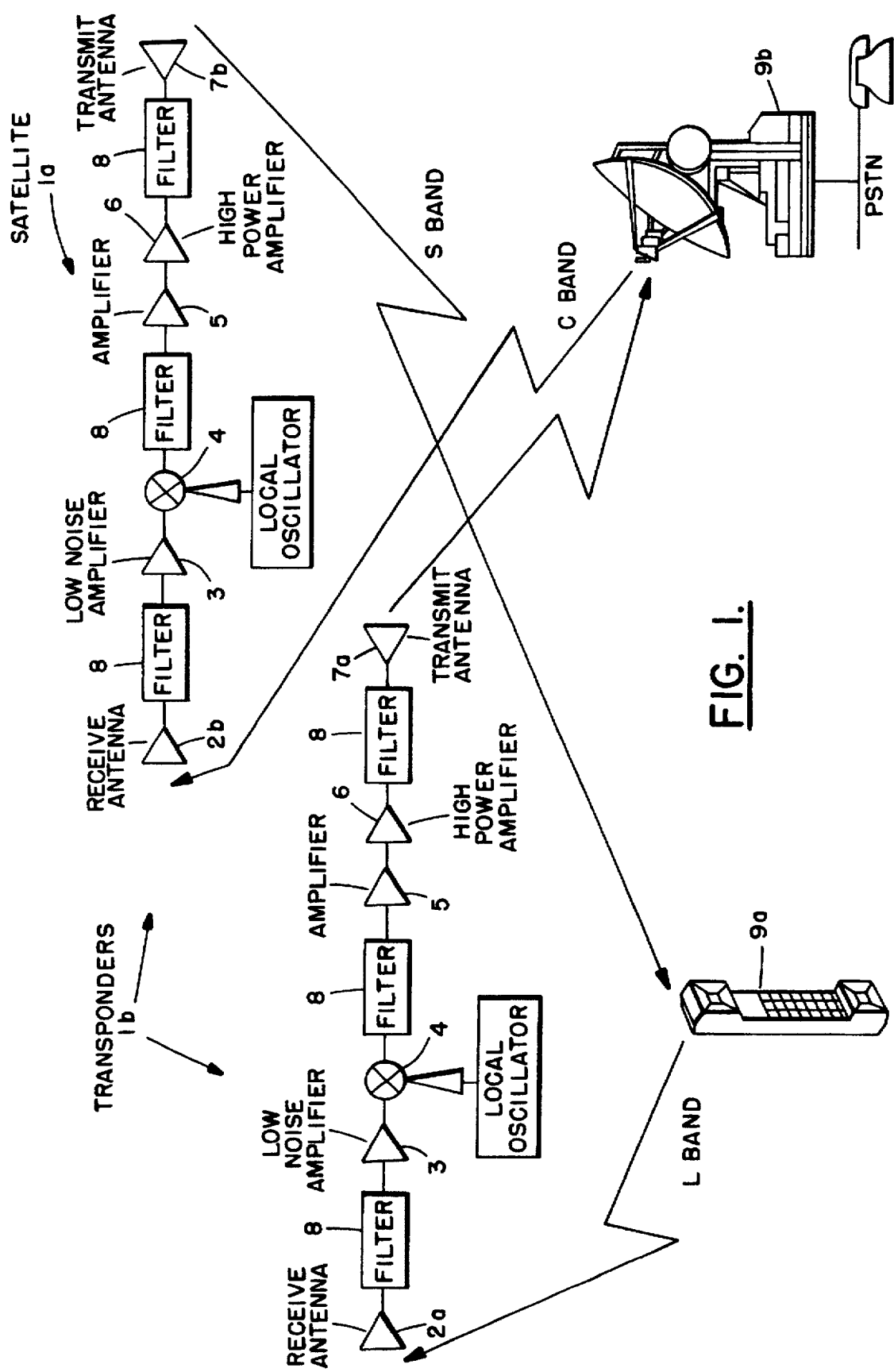
FIG. 1 is an overall block diagram of a satellite-based communication system that is suitable for use in practicing this invention.

FIG. 1 illustrates a generic model for the payload of a communications satellite 1 a of a type to which this invention pertains. More particularly, FIG. 1 illustrates a typical satellite transponder 1b configured for full duplex communication. The communications payload includes one or more such transponders having a plurality of antennas 2 to receive signals from the earth's surface, low noise amplifiers 3, frequency shifters or converters 4 comprised of a local oscillator and a mixer, followed by amplifiers 5, high power amplifiers 6 and transmitting antennas 7. Filters 8 are also included to pass desired in-band signals and reject unwanted out-of-band noise signals. One transponder receives signals from user terminals 9a, frequency shifts the received user signals, and transmits the frequency shifted signals to a ground station, such as a gateway 9b that is connected to the public switched telephone network (PSTN). A second transponder receives signals from one or more of the gateways 9b, frequency shifts the received signals, and transmits the frequency shifted signals to the user terminals 9b. In this manner a full duplex communication path (voice and/or data) is established between user terminals and terminals connected to the PSTN.

By example, the user terminals 9a (fixed or mobile) are capable of operating in a full duplex mode and communicate via, by example, L-band RF links (uplink) and S-band RF links (downlink) through the return and forward satellite transponders, respectively. Uplink L-band RF links may operate within a frequency range of 1.61 GHz to 1.6265 GHz, bandwidth 16.5 MHz, and are preferably modulated with voice signals and/or digital signals in accordance with a spread spectrum technique. Downlink S-band RF links may operate within a frequency range of 2.4835 GHz to 2.5 GHz, bandwidth 16.5 MHz. The gateway 9b may communicate with the satellite 1a via receive antenna 2b and transmit antenna 7a with, by example, a full duplex C-band RF link that may operate within a range of frequencies centered on 5 GHz. The C-band RF links bi-directionally convey communication feeder links, and also convey satellite commands (forward link) and receive telemetry information (return link). The L-band and the S-band satellite antennas 2a and 7b, respectively, are multiple beam (preferably 16 beam) antennas that provide earth coverage within an associated service region. The L-band and S-band satellite antennas 2a and 7b are preferably congruent with one another. As an example, a total of approximately 3000 full duplex communications may occur through a given one of the satellites. Two or more satellites 1a may each convey the same communication between a given user terminal 9a and one of the gateways 9b by the use of spread spectrum techniques. This mode of operation thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateway 9b and the satellite 1a may use frequencies in a band other than the C-band, for example the Ku or Ka bands.

Figure 2:
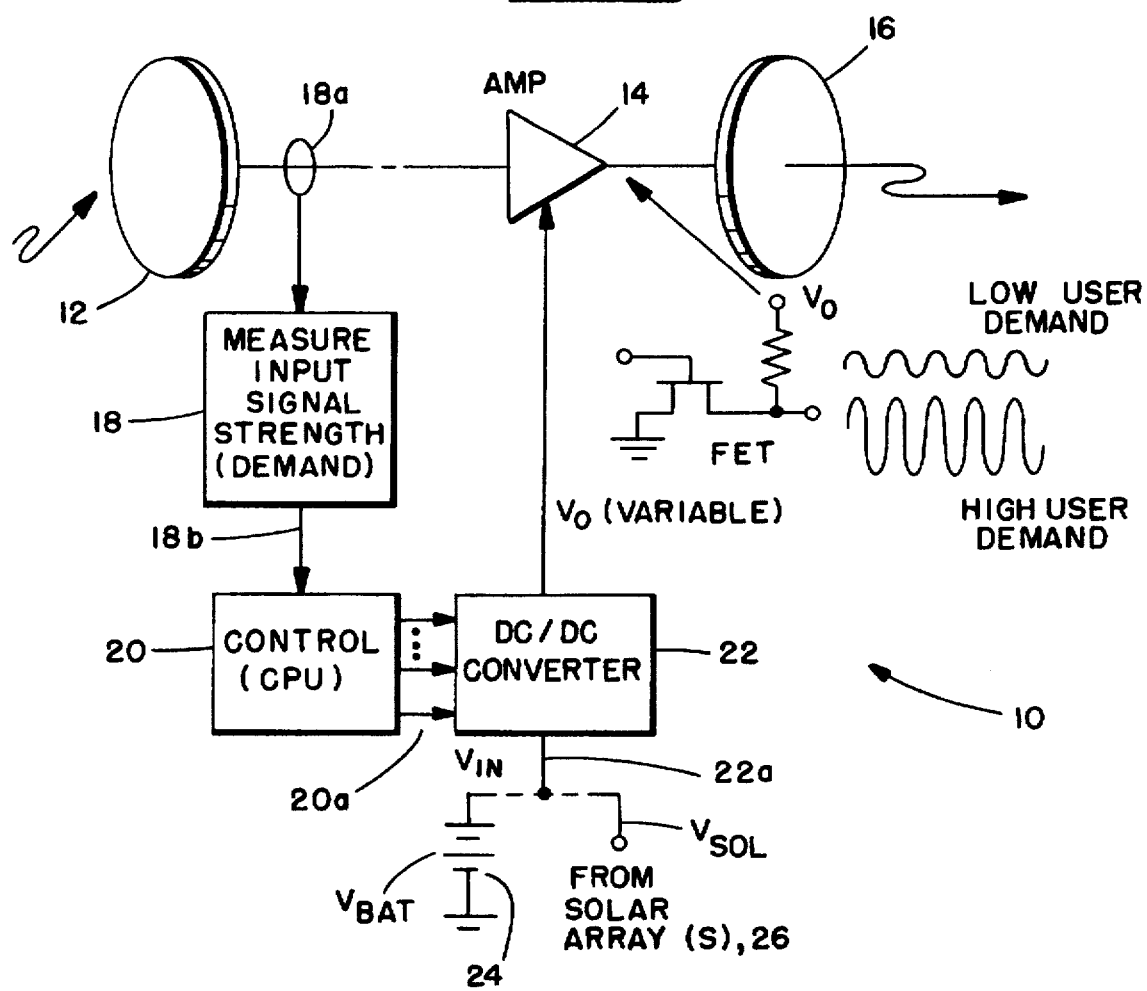
FIG. 2 is a block diagram of a transmitter amplifier power control system in accordance with this invention.

Reference is made to FIG. 2 for showing a block diagram of a presently preferred embodiment of this invention. A satellite communications payload 10 includes a receive antenna 12 for receiving uplink communications from one or more ground-based transmitters (user terminals 9a or gateways 9b). The received signal is processed as indicated in FIG. 1 and is eventually provided to an amplifier 14 and thence to a transmit antenna 16 for transmission to one or more ground-based receivers (user terminals 9a or gateways 9b). The receive antenna 12 and the transmit antenna 16 are preferably constructed as an array of antenna elements.

As such, the amplifier 14 may actually represent a plurality of transmit amplifiers individual ones of which have an output coupled to an antenna element of a phased array transmitter antenna. One suitable embodiment for the transmit antenna 16 is described in commonly assigned U.S. Pat. No. 5,283,587, issued Feb. 1, 1994, entitled "Active Transmit Phased Array Antenna" by Edward Hirshfield et al. The disclosure of this U.S. Patent is incorporated by reference herein in its entirety. Other suitable embodiments for the antennas and for the overall communications payload are described in U.S. patent application Ser. No. 08/060,207, filed May 7, 1993, entitled "Mobile Communication Satellite Payload" by Edward Hirshfield et al. now U.S. Pat. No. 5,422,647, issued Jun. 6, 1995. Reference is also made to U.S. patent application Ser. No. 08/189,111, filed Jan. 31, 1994, entitled "Active Transmit Phase Array Antenna with Amplitude Taper" by Edward Hirshfield now U.S. Pat. No. 5,504,493, issued Apr. 2, 1996.

In accordance with this invention the communications payload 10 includes a mechanism for increasing the efficiency of the communications payload 10 by detecting the communications demand and employing this information to vary the power drawn from the satellite power supply system. In this regard there is provided a signal strength measurement block 18 having an input coupled to an output of the receive antenna 12. The signal strength or power at this point is indicative of the total user demand for this particular satellite (the received power and received signal strength are used interchangeably herein). The detected signal strength or power is provided to a controller 20, such as a central processing unit (CPU), which generates a plurality of digital control signals 20a for controlling a DC/DC converter 22. The DC/DC converter 22 is coupled via satellite power bus 22a ($V_{IN}$) to remotely connected satellite batteries 24 and to remotely connected solar arrays 26. The battery potential is designated as $V_{BAT}$ while the potential generated by the solar arrays 26 is designated as $V_{SOL}$. The DC/DC converter 22 is controlled by the digital inputs 20a to vary the output voltage of the converter 22. The output voltage of the converter 22 is designated as $V_O$. The output of the DC/DC converter 22 is used to power the amplifier 14 in such a manner that a lower supply voltage is used during a time of low user demand, while a higher supply voltage is used during a time of high user demand. By varying the supply voltage to the amplifier 14 the power consumption of the amplifier is varied as a function of demand. By example only, $V_O$ is varied between 2 VDC and 8 VDC.

In accordance with a further aspect of this invention, described in detail below, there is provided an improved DC/DC converter 22 that overcomes a problem of a reduction in efficiency when a greater amount of voltage must be dropped across the converter. That is, when providing a reduced converter 22 output voltage the difference between $V_O$ and $V_{IN}$ must be dropped across the converter 22. In conventional DC to DC converter designs this causes a reduction in efficiency. Any such reduction in converter efficiency will tend to offset the efficiency enhancement provided by operating the output amplifier 14 at a reduced power level during periods of low user demand.

It is noted that amplifiers that draw supply power proportional to their output power are well known, such as Class C or Class A-B amplifiers. These amplifiers appear to operate efficiently when the ratio of power consumed to signal power produced is used as the only measure. However, satellite communication systems that support multiple signals simultaneously require that the amplifiers operate in their linear region to produce signals with low distortion and low interference between multiple signals. Class C amplifiers are not linear because they distort, clip or limit the signals that pass through them. Class A-B amplifiers can be made linear, but they also distort signals when the signal power approaches the maximum rated power of the amplifier.

Alternatively, push-pull amplifiers are linear and consume power proportional to signal power. However, at the current state-of-the-art of semiconductor devices the use of push-pull amplifiers is not practical. This is because matched, efficient solid state devices that can be supplied with both negative and positive power supplies (e.g., PNP and NPN transistors), and that are capable of operation at the microwave frequency bands that are typically used in satellite communication systems, are not yet available.

In a presently preferred embodiment of this invention field effect transistors (FETs) are used in the high power amplifier stages. FETs are generally linear across a wide range of primary supply voltage. For example, FETs are capable of operation with nearly constant gain with supply voltages that range from 2 to 8 volts. In this case, and when 2 volts is used for the supply voltage $V_0$, the maximum amplifier power that can be produced is at a minimum. Conversely, when $V_0$ is set to 8 volts the maximum amplifier power is at a maximum. The range of maximum signal power that can be produced in this example is $(8/2)^2=16$ (12 dB). The power consumed by the amplifier 14 varies in a similar manner.

Thus, this invention teaches the use of signal amplifiers (preferably FETs) that operate in a linear fashion (nominally Class A or Class A-Class A-B) across a wide dynamic range with a power consumption that is approximately proportional to demand.

The communications demand is preferably sensed in the low noise amplifier portion 3 (FIG. 1) of the transponder. The signal strength measurement block 18 includes a signal strength detector 18a and an analog-to-digital (A/D) converter which sends a digital signal 18b to the controller 20. The signal strength detector 18a may be a simple diode detector. The signal strength detector 18a can also be a noise-riding detector that outputs a signal from which a received noise component is subtracted. One suitable technique to implement a noise-riding detector is to employ two diode detectors. A first diode detector detects the out-of-band received signal and a second diode detector, positioned after the first filter 8 or the low noise amplifier 3 of FIG. 1, detects the in-band received signal. A differential amplifier can then be employed to output a signal that represents the difference between the out-of-band and the in-band received signals and, thus, the received power level that is a combination of all of the user signals that are being received. The controller 20 uses the digital received signal strength information to compute a value to be sent over digital signal lines 20a to command the DC/DC converter 22 to produce a specified supply voltage $V_0$ to the FET amplifier 14. The controller 20 is employed to enable incorporation, via computer software, of any nuances in the control process necessary to assure operational stability, while at the same time providing the efficiency desired.

In this regard the controller 20 may employ a linear relationship between the detected received power and the corresponding transmitter output power. The controller may further consider the amplifier loop gain (detected input power) and the loop filtering characteristics (maximum rate of change of the detected input power) when determining the value of $V_O$ and, hence, the output power of the transmitter 14. The controller 20 may optionally determine a value for $V_0$ as a function of a predicted demand based on historical demand. Alternatively, the time of day and geographical location can be considered to predict an anticipated user demand over a next time increment of, by example, five minutes. In this manner, and when approaching a large urban area during daylight hours, the value of $V_0$ can be set to provide full transmitter power. It is also within the scope of this invention to control the output power level of the transmitter amplifier 14 either partially or entirely in accordance with information received over a telemetry link from a ground-based controller.

As was stated previously, a further aspect of this invention is the use of a DC/DC converter to efficiently produce the variable supply voltage $V_0$ and the resultant prime power necessary to drive the high power FET amplifier 14. In this regard the variable voltage is generated by varying the on-time percentage of the pulse train which is used to drive the chopper and integrating filter within the DC/DC converter 22.

Figure 3:
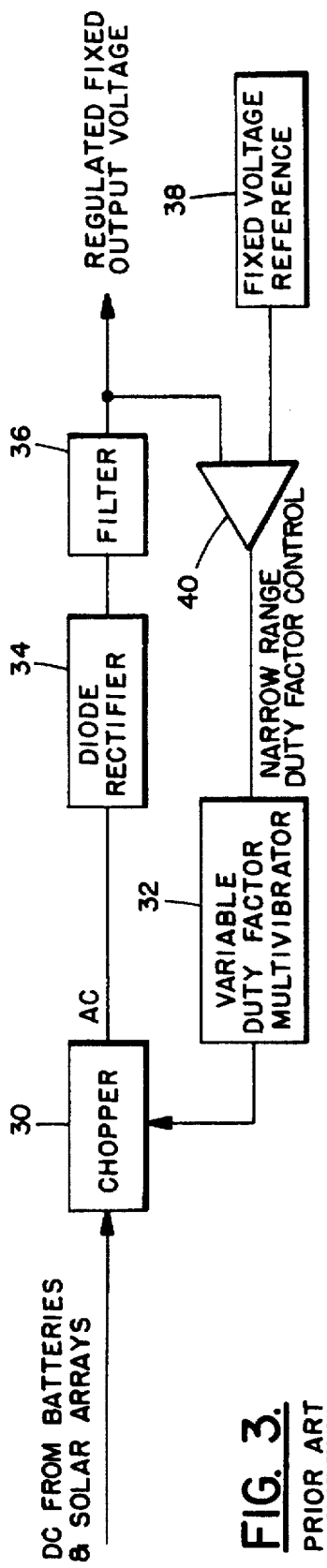
FIG. 3 is a block diagram of a conventional satellite DC/DC converter.

A conventional satellite DC/DC converter is illustrated in FIG. 3. A DC voltage is provided from the satellite batteries or from the solar arrays and is chopped by block 30, under the control of a variable duty factor multivibrator 32, into an AC signal. The AC signal is rectified by block 34 and filtered by block 36, to provide the output voltage. The output voltage is sensed and compared to a fixed voltage reference 38 by a comparator 40. The output of the comparator 40 indicates the deviation of the output voltage from the reference voltage about a narrow range. This signal is used to control the duty factor or cycle of the multivibrator block 32, thus providing a closed loop control system to maintain the output voltage at a predetermined level that is specified by the fixed reference voltage 38.

Such converters tend to decrease in efficiency as the output voltage decreases. This is primarily due to the use of a diode rectifier 34 to rectify the chopped (AC) voltage. Such diodes have a typical voltage drop of at least 0.6 V. When such converters are required to produce a low voltage (e.g., 2 volts), the 0.6 volt drop in the diode result in a baseline loss in efficiency of 1-2/2.6 or 23%. If, by example, the high power amplifier 14 of FIG. 2 were to require 1000 Watts an additional 230 Watts would need to be generated because of the losses in the rectifying diode 34.

Figure 4:
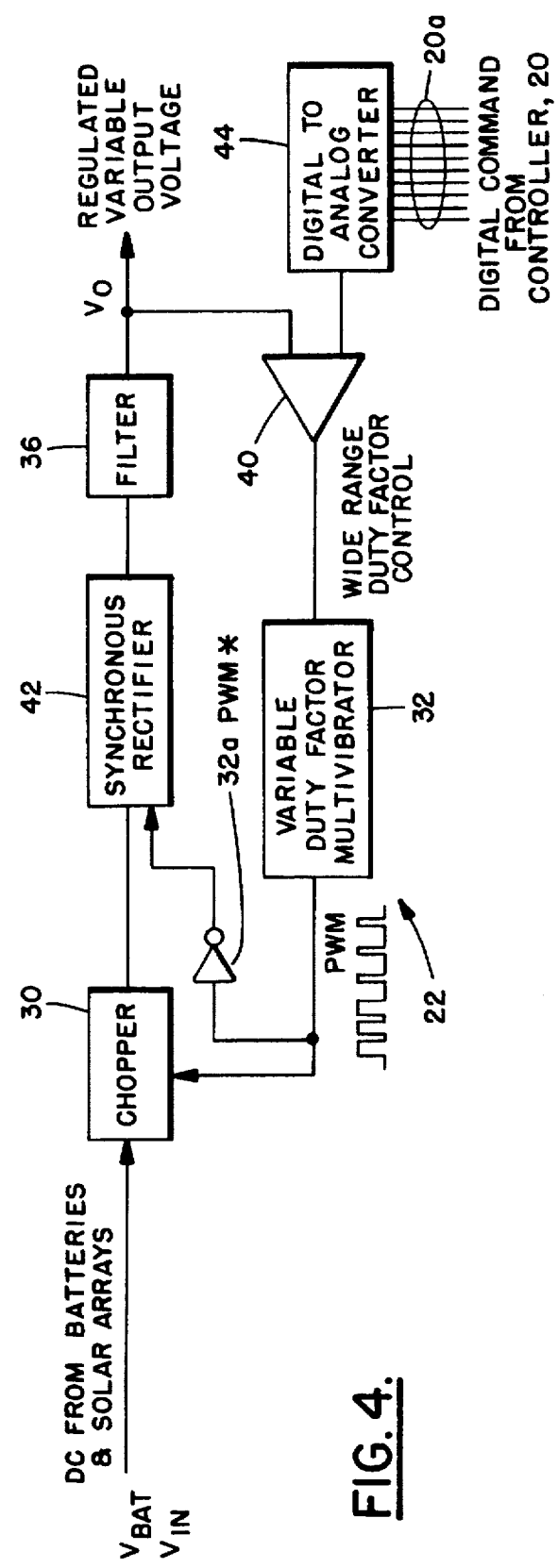
FIG. 4 is a block diagram of a presently preferred embodiment of a satellite DC/DC converter for use in practicing this invention.

To avoid this wasted power, and the associated reduction in efficiency, the DC/DC converter of this invention employs power FETs (block 42, FIG. 4) that are turned on synchronously, with the chopping signal, by the output of an inverter 32a. In FIG. 4 the signal that drives the chopper is referred to as a Pulse Width Modulated (PWM) signal, while the inverted signal that drives the synchronous rectifier 42 is referred to as a PWM* signal. Many power FETs exhibit a low electrical on-resistance (e.g., as low as several milliohms when several FETs are employed in parallel). The use of FETs to construct the synchronous rectifier 42 thus reduces the inefficiency to less than 5% from the 23% cited above for the diode rectifier case.

It should be realized that the depiction of the inverter 32a for generating the PWM* signal is a simplification. In practice suitable delays are inserted between the onset of either the PWM or the PWM* signals to insure that both are not simultaneously active. This prevents S1 and S2 from simultaneously conducting. Control over the timing of the PWM and PWM* signals also serves to control the conduction of the parasitic body source-drain diode within each MOSFET switch.

Also shown in FIG. 4 is the use of a digital to analog (D/A) converter 44 to provide a wide range reference voltage to the comparator 40. The input of the D/A converter 44 is connected to the digital signal lines 20a output from the controller 20 of FIG. 2.

Figure 5:
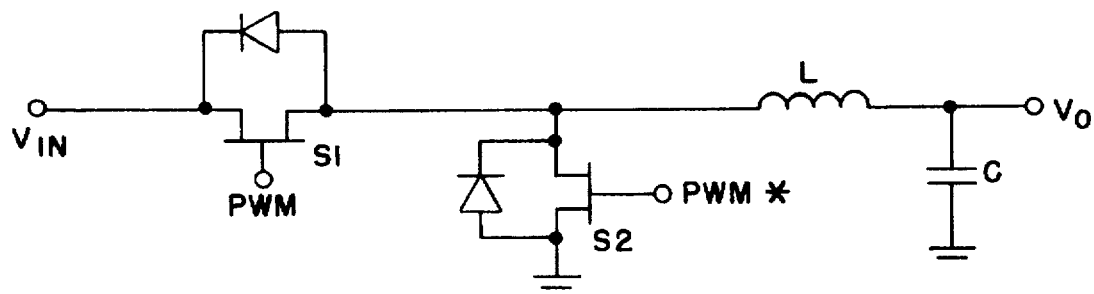
FIG. 5 is a schematic diagram of a power train portion of the satellite DC/DC converter of FIG. 4.

Reference is now made to FIG. 5 for showing a simplified schematic of the power train portion of the DC/DC converter 22 of this invention. The input DC voltage ($V_{IN}$) is chopped by a FET designated as switch 1 (S1). The gate of S1 is connected to the PWM signal. This arrangement may be referred to as a non-isolated buck topology. In FIG. 5 a conventional buck catch diode is replaced with a power N-channel MOSFET (S2) that is driven with the PWM* signal. S2 thus functions as the synchronous rectifier 42 of FIG. 4. The resulting DC voltage is smoothed and filtered with the inductor L and the capacitor C to provide the amplifier 14 supply voltage $V_O$.

Figure 6:
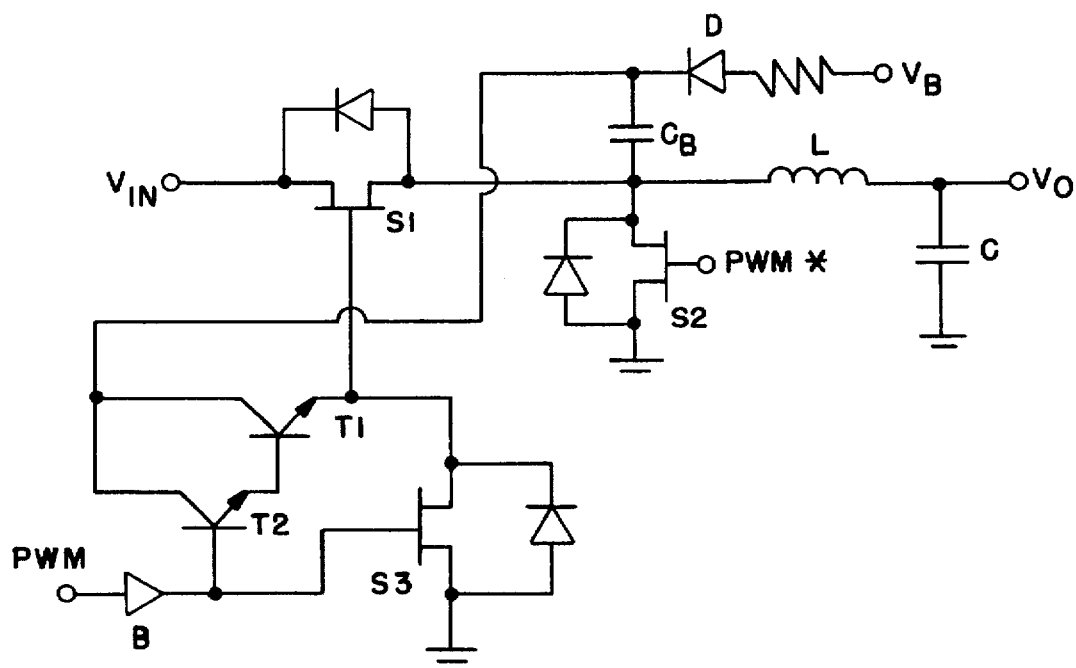
FIG. 6 is a more detailed schematic diagram of the power train portion shown in FIG. 5.

FIG. 6 is a more detailed schematic that illustrates the use of a boot strap capacitor $C_B$ to generate a buck switch (S1) enhancement voltage in accordance with an aspect of this invention. In this case a bias potential $V_B$ (for example, +15 volts) is applied through an isolation diode D to a node to which is connected $C_B$ and a collector of a Darlington transistor pair comprised of T1 and T2. The base of the Darlington pair is driven with the PWM signal via a buffer B. The buffered PWM signal also drives the gate of an N-channel MOSFET switch S3. The emitter of the Darlington pair and the source of S3 are connected to the gate of the buck switch S1. In that $C_B$ is connected between the unregulated DC potential and the bias potential $V_B$, an enhanced gate drive is supplied to the buck switch S1. In practice, the converter 22 is comprised of five interleaved stages each of which is constructed as shown in FIG. 6.

In operation, the PWM signal being active turns on the switch S3 and also the Darlington pair comprised of T1 and T2. The Darlington pair functions in a manner analogous to a pull-up resistor that is connected between the source of S3 and $V_B$, thereby increasing the gate drive and reducing the turn-on and turn-off times of the buck switch S1.

An advantage of this technique is an increased operating efficiency compared with a conventional floating supply. This technique is also cost effective as well as being amenable for use in hybrid circuits. The DC/DC converter efficiency achieved with this circuit is greater than 82% at low power and low voltage (e.g., 2 volts), and is greater than 93% at maximum voltage (e.g., 8 volts) and maximum power (e.g., 1300 W).

The use of this invention, when combined with the active transmit phased array disclosed in U.S. Pat. No. 5,283,587, provides a significant increase in overall satellite communications payload efficiency. This is true at least for the reason that the operating power of the amplifiers 40 and 42 in FIG. 4 of U.S. Pat. No. 5,283,587, for each element of the phased array transmit antenna, can be uniformly varied as a function of communications demand.

In U.S. Pat. No. 5,283,587 there is disclosed a technique for generating high efficiency multiple beams using only variable phase coefficients in a phased array antenna. By using phase only, every active element in the array experiences the same power at the same time. As a result, the effects of changing transmit power levels are equal in all the amplifiers. Active devices, no matter how linear their instantaneous transfer characteristic, behave differently at different power levels. In accordance with the transmit phased array disclosed in U.S. Pat. No. 5,283,587 all elements are exposed to the same signal environment at the same time, and thus they preserve the phase information for each signal on a relative basis. This enables the antenna beam shapes to be maintained across a wide range of operating conditions.

Although a presently preferred embodiment of this invention is well suited for use in individual satellites of a constellation of LEO communication satellites, the teaching of this invention is not limited to only this one important application. By example, the teaching of this invention can be applied generally to a wide variety of transmitter applications, both ground-based and space-based, as well as to non-LEO, such as geosynchronous, satellite systems. Furthermore, and although the communications signals in the preferred embodiment are in the form of a spread spectrum format; other formats, such as Time Division, Multiple Access (TDMA) and Frequency Division, Multiple Access (FDMA), can also be employed.

Thus, while the invention has been particularly shown and described with respect to a preferred embodiment thereof, it will be understood by those skilled in the art that changes in form and details may be made therein without departing from the scope and spirit of the invention.

What is claimed is:

1. A method for operating a communications signal transmitter, comprising the steps of:

receiving a communications signal;

sensing a signal strength of the received communications signal;

adjusting an output of a power supply that supplies operating power to a communications signal transmitter amplifier in accordance with the sensed signal strength so as to increase the output of the power supply when the sensed signal strength increases and to decrease the output of the power supply when the sensed signal strength decreases; and amplifying the received communications signal with the communications signal transmitter amplifier;

wherein the step of adjusting includes the steps of:

setting the duty cycle of a pulse width modulated signal as a function of at least the sensed signal strength;

driving a switch means with the pulse width modulated signal to chop a primary DC source into an AC signal; and synchronously rectifying the AC signal with an inverse of the pulse width modulated signal to provide a DC output from the power supply for supplying the operating power to the communications signal transmitter amplifier.

2. A method for operating a communications payload of a satellite, comprising the steps of:

receiving communications signals for a plurality of users;

sensing a demand for the communications payload at least in part from the received communications signals;

frequency shifting the received communications signals;

adjusting an output of a power supply that supplies operating power to a communications payload signal transmitter amplifier in accordance with the sensed demand so as to increase the output of the power supply when the sensed demand increases and to decrease the output of the power supply when the sensed demand decreases; and amplifying the frequency shifted communications signals with the communications signal transmitter amplifier;

wherein the step of adjusting includes the steps of:

setting the duty cycle of a pulse width modulated signal as a function of at least the sensed demand;

driving a first switch means with the pulse width modulated signal to chop a primary DC source into an AC signal; and synchronously rectifying the AC signal with an inverse of the pulse width modulated signal to provide a DC output from the power supply for supplying the operating power to the communications signal transmitter amplifier.

3. A method as set forth in claim 2 wherein the step of synchronously rectifying includes a step of driving a second switch means with the inverse of the pulse width modulated signal.

4. A method as set forth in claim 2 wherein the first switch means is comprised of a field effect transistor (FET) that is coupled between the primary DC power source and a synchronous rectifier, and wherein the step of driving includes a step of employing a boot strap capacitor that is coupled between the synchronously rectified AC signal and a predetermined bias potential to enhance the pulse width modulated signal that is applied to a gate of the FET so as to reduce the turn-on and turn-off times of the FET.

5. A communications signal transponder, comprising:

a receiver for receiving a communications signal;

means for sensing a signal strength of the received communications signal;

a transmitter amplifier for amplifying the received communications signal;

a power supply for providing operating power to the transmitter amplifier; and means for adjusting an output of the power supply in accordance with the sensed signal strength so as to increase the output of the power supply when the sensed signal strength increases and to decrease the output of the power supply when the sensed signal strength decreases;

wherein said adjusting means is comprised of means for setting the duty cycle of a pulse width modulated signal as a function of at least the sensed signal strength; and wherein said power supply is comprised of:

means for driving a switch means with the pulse width modulated signal to chop a primary DC source into an AC signal; and means for synchronously rectifying the AC signal with an inverse of the pulse width modulated signal to provide a DC output from the power supply for supplying the operating power to the communications signal transmitter amplifier.

6. A satellite communications payload, comprising:

a receiver for receiving communications signals for a plurality of users;

means for sensing a demand for the communications payload at least in part from the received communications signals;

means for frequency shifting the received communications signals;

a transmitter amplifier for amplifying the shifted communications signals;

a power supply for providing operating power to the transmitter amplifier; and means for adjusting an output of said power supply in accordance with the sensed demand so as to increase the output of the power supply when the sensed demand increases and to decrease the output of the power supply when the sensed demand decreases;

wherein said adjusting means is comprised of means for setting the duty cycle of a pulse width modulated signal as a function of at least the sensed demand; and wherein said power supply is comprised of:

means for driving a switch means with the pulse width modulated signal to chop a primary DC source into an AC signal; and means for synchronously rectifying the AC signal with an inverse of the pulse width modulated signal to provide a DC output from the power supply for supplying the operating power to the communications signal transmitter amplifier.

7. A communications satellite payload as set forth in claim 6 wherein said means for synchronously rectifying includes means for driving a second switch means with the inverse of the pulse width modulated signal.

8. A communications satellite payload as set forth in claim 6 wherein the first switch means is comprised of a field effect transistor (FET) that is coupled between the primary DC power source and said means for synchronously rectifying, and wherein said driving means is comprised of a boot strap capacitor that is coupled between the synchronously rectified AC signal and a predetermined bias potential to enhance the pulse width modulated signal that is applied to a gate of the FET so as to reduce the turn-on and turn-off times of the FET.

9. A communications payload for use on a spacecraft, comprising:

a receiver for receiving uplinked communications signals to be transmitted to a plurality of terrestrial receivers;

circuitry coupled to said receiver for sensing a demand for the communications payload at least in part from the received uplinked communications signals;

at least one substantially linear transmitter amplifier coupled to said receiver for amplifying the received communications signals prior to transmission of the communications signals to the terrestrial receivers;

a dc—dc converter for providing operating power to the at least one transmitter amplifier, said dc—dc converter providing an output voltage that is adjustable within a range of output voltages; and a controller coupled to said demand sensing circuitry and to said dc—dc converter for adjusting the output voltage of the dc—dc converter in accordance with the sensed demand so as to increase the output voltage of the dc—dc converter when the sensed demand increases and to decrease the output voltage of the dc—dc converter when the sensed demand decreases such that the power consumption of the at least one transmitter amplifier is varied as a function of the sensed demand.

10. A communications payload as set forth in claim 9, wherein said at least one transmitter amplifier is comprised of a FET amplifier having substantially constant gain over said range of output voltages.

11. A communications payload as set forth in claim 10, wherein said range of output voltages is between about 2 volts and about 8 volts.

12. A communications payload as set forth in claim 10, wherein said FET amplifier is operated nominally Class A or Class A-Class A-B.

13. A communications payload as set forth in claim 10, wherein said demand sensing circuitry is responsive to at least one of a signal strength of the received communications signals, a predicted demand for the communications payload based on historical demand, and a predicted demand based at least in part on a position of spacecraft.

14. A communications payload as set forth in claim 10, wherein said demand sensing circuitry is responsive to at least one of information generated on the spacecraft and information generated on the ground and transmitted to the spacecraft.

* * * * *

UNITED STATES PATENT AND TRADEMARK OFFICE
CERTIFICATE OF CORRECTION

PATENT NO. : 5,787,336
DATED : July 28, 1998
INVENTOR(S) : Hirshfield et al.

It is certified that error appears in the above-identified patent and that said Letters Patent is hereby corrected as shown below:

On the title page, item [75] and item [19];

delete "Hirschfield" and replace with --Hirshfield--.

Signed and Sealed this

Fifteenth Day of December, 1998

*Attest:*

BRUCE LEHMAN

*Attesting Officer*     *Commissioner of Patents and Trademarks*